US012005282B2

(12) United States Patent
Li et al.

(10) Patent No.: US 12,005,282 B2
(45) Date of Patent: Jun. 11, 2024

(54) AUTOMATIC SAFEGUARD BOTTLE SYSTEM AND AUTOMATIC CONTROL METHOD THEREFOR

(71) Applicant: SHANGHAI KINO SAFETY EQUIPMENT LIMITED, Shanghai (CN)

(72) Inventors: Hai-Bo Li, Shanghai (CN); Du-Cheng Cai, Shanghai (CN)

( * ) Notice: Subject to any disclaimer, the term of this patent is extended or adjusted under 35 U.S.C. 154(b) by 631 days.

(21) Appl. No.: 16/603,251

(22) PCT Filed: Apr. 3, 2018

(86) PCT No.: PCT/CN2018/081711
§ 371 (c)(1),
(2) Date: Mar. 15, 2020

(87) PCT Pub. No.: WO2018/201838
PCT Pub. Date: Nov. 8, 2018

(65) Prior Publication Data

US 2020/0197735 A1 Jun. 25, 2020

(30) Foreign Application Priority Data

May 3, 2017 (CN) ......................... 201710302722.6

(51) Int. Cl.
*A62C 37/44* (2006.01)

(52) U.S. Cl.
CPC .................................... *A62C 37/44* (2013.01)

(58) Field of Classification Search
CPC ........... A62C 3/07; A62C 35/13; A62C 35/11; A62C 35/023; A62C 37/46; F16K 31/383
See application file for complete search history.

(56) References Cited

U.S. PATENT DOCUMENTS 3,580,274 A * 5/1971 Hansen .................. F16K 17/18
137/493
4,073,464 A * 2/1978 Hansen ................ F16K 31/383
251/30.02

(Continued)

FOREIGN PATENT DOCUMENTS

CN 2628091 A 6/2003
CN 2628091 Y 7/2004

(Continued)

*Primary Examiner* — Joseph A Greenlund
(74) *Attorney, Agent, or Firm* — OPES IP Consulting Co. Ltd.

(57) ABSTRACT

The present invention discloses an automatic safeguard bottle system comprising one or more bottle which are provided with bottle valves, the bottle valves are connected with an electronic control device which can realize signal transmission with the controller, the electronic control device is opened by the controller, so that the gas in the upper cavity is discharged outward, the pressure of the upper cavity decreases, and the piston moves upward, so as to realize the automatic opening of the valve port, the medium in the bottle is released outward through the nozzle, the electronic control device is closed by the controller, and the piston moves down and reset, so as to realize the automatic closing of the valve port and stop the nozzle releasing the medium. The present invention has the functions of automatic starting and resetting, thereby realizing multiple medium releasing. The present invention also discloses an automatic control method of an automatic safeguard bottle system.

11 Claims, 5 Drawing Sheets

(56) References Cited

U.S. PATENT DOCUMENTS

| | | | | |
|---|---|---|---|---|
| 6,164,381 | A * | 12/2000 | Sundholm | A62C 35/023 169/15 |
| 2005/0072463 | A1* | 4/2005 | Sundholm | F16K 1/304 137/68.3 |
| 2006/0032641 | A1* | 2/2006 | Akins | G01K 3/00 169/56 |
| 2008/0128145 | A1* | 6/2008 | Butz | A62C 35/023 169/46 |
| 2009/0178811 | A1* | 7/2009 | Sun | F16K 31/383 251/324 |
| 2011/0000801 | A1* | 1/2011 | Hirakawa | A62C 3/07 206/223 |
| 2011/0168415 | A1* | 7/2011 | Karalis | F16K 31/383 169/37 |
| 2012/0152571 | A1* | 6/2012 | Andreas | A62C 35/68 222/3 |
| 2012/0168184 | A1* | 7/2012 | Enk, Sr. | A62C 5/02 169/14 |
| 2012/0211684 | A1* | 8/2012 | Zlatintsis | F16K 17/38 374/188 |
| 2013/0081724 | A1* | 4/2013 | Childs | C02F 1/441 137/625 |
| 2016/0247373 | A1* | 8/2016 | Muhammad | A62C 35/68 |
| 2016/0263410 | A1* | 9/2016 | Enk, Sr. | A62C 99/0036 |
| 2017/0113080 | A1* | 4/2017 | Specht | A62D 1/0014 |
| 2017/0189730 | A1* | 7/2017 | Ernfjäll | A62C 35/68 |
| 2019/0151690 | A1* | 5/2019 | Kho | A62C 35/13 |
| 2020/0197735 | A1* | 6/2020 | Li | A62C 37/46 |
| 2021/0146180 | A1* | 5/2021 | Griffin | A62C 13/64 |
| 2021/0299495 | A1* | 9/2021 | Feenstra | F16K 7/17 |
| 2021/0364091 | A1* | 11/2021 | Kunau | F16K 31/383 |

FOREIGN PATENT DOCUMENTS

| | | | |
|---|---|---|---|
| CN | 2669908 | Y | 1/2005 |
| CN | 101823598 | A | 5/2010 |
| CN | 101983740 | A | 11/2010 |
| CN | 102716561 | A | 7/2012 |
| CN | 103939619 | A | 7/2013 |
| CN | 203335944 | U | * 12/2013 |
| CN | 104208834 | A | 9/2014 |
| CN | 105169583 | A | 8/2015 |
| CN | 204723638 | U | 10/2015 |
| CN | 106097632 | A | 7/2016 |
| CN | 206852959 | A | 5/2017 |
| CN | 106975186 | A | 7/2017 |

* cited by examiner

AUTOMATIC SAFEGUARD BOTTLE SYSTEM AND AUTOMATIC CONTROL METHOD THEREFOR

CROSS REFERENCE TO RELATED APPLICATION

The present application claims priority to CN Application Serial No. 201710302722.6, filed on May 3, 2017, and PCT Application Serial No. PCT/CN2018/081,711, filed on Apr. 3, 2018, which are hereby incorporated by reference in their entirety.

FIELD

The present invention relates to a safety protection system, in particular to an automatic safeguard bottle system. The present invention also relates to an automatic control method for an automatic safeguard bottle system.

BACKGROUND

Automatic fire extinguishing system is a common safety protection system, such as a cylinder system with CO2, Novec-1230, FM-200, IG-55, IG-541, dry powder and other liquid, gas or solid fire extinguishing medium, which needs to be equipped with detector and fire control panel.

For the detection and fire extinguishing in narrow space or inaccessible place, the automatic fire extinguishing system cannot be applied because of many equipments and difficult installation, and the use of fire extinguishers cannot automatically, reliably and effectively ensure the safety of facilities. In case of cylinder leakage, failure alarm or maintenance and replacement, it is difficult for personnel to access or enter the protection place for operation and actions.

In addition, the existing automatic fire extinguishing system is a one-time medium releasing for a specific space or facility, and releasing until the end of the discharging, and then need to be refilled or maintained at factory. It is difficult for the existing automatic fire extinguishing system to reliably and economically solve the potential safety hazards in inaccessible and time-consuming maintenance facilities and places, such as wind turbine engine room, port cranes and mining machinery.

For the battery compartment of new energy vehicles and buses, water-based, dry powder and aerosols can not effectively and reliably provide fire extinguishing or safety protection because of their small space and less available volume. The thermal runaway point of lithium batteries is difficult to determine, and the conventional fire extinguishing system is once-only use, once missed, it will lead to fire and the whole system runaway. A large number of medium which are released by fire extinguishers system or gaseous blowing by the battery runs out of control will cause disturbance and pressure relief, also extinguishing medium will be wastage heavily. The dosage of the actual extinguishing agent is small, and it is difficult to retain the appropriate agent to inhibit the re-ignition. It is necessary to consider the effect of gaseous pressure on the sealing and pressure relief performance of the battery compartment during medium release, and to solve the cooling, flame-retardant and explosion suppression effects before or after fire.

Moreover, the existing automatic fire extinguishing system detects smoke, temperature or infrared abnormalities in the early stage of a fire through various high-sensitivity detectors, and can not give an alarm before the fire occurs.

SUMMARY OF THE DISCLOSURE

The present invention is made for solving the above problems and aims to provide an automatic safeguard bottle system, which has the functions of automatic starting and resetting, thereby releasing the medium with several times.

To solve the above technical problems, the technical solution of the automatic safeguard bottle system of the present invention includes one or more bottle 1, medium 4, bottle valve 6, nozzle 8, electronic control device, signal acquisition element 12, controller 11, and the bottle 1 is provided with the bottle valve 6, the bottle valve 6 is connected with the electronic control device, which realizes the signal transmission with the controller 11 by wired or wireless mode. The bottle valve 6 includes valve body 6-1, piston 6-2, valve port 6-7, the piston 6-2 is movably arranged in the valve body 6-1, the piston 6-2 divides the inner cavity of the valve body 6-1 into the upper cavity 6-3 and the lower cavity 6-4, and the lower cavity 6-4 is connected with the inner cavity of the bottle 1, the valve body 6-1 is connected with the valve port 6-7, the valve body 6-1 and the valve port 6-7 are split or integrated. The piston 6-2 can move up and down when the gaseous pressure in the upper cavity 6-3 and/or the lower cavity 6-4 changes, so as to open or close the valve port 6-7, the valve port 6-7 connects with the nozzle 8, the nozzle 8 is arranged in the protected space Zn, the protected space Zn is installed with a signal acquisition element 12, the signal acquisition element 12 realizes the signal transmission with the controller 11 by wired or wireless mode, opening the electronic control device by the controller 11, the gas in the upper cavity 6-3 discharges outward, the pressure of the upper cavity 6-3 reduces, and the piston 6-2 moves upward, thus realizing the automatic opening of the valve port 6-7, and releasing the medium 4 in the bottle 1 to protected space through the nozzle 8, with closing the electronic control device by the controller 11, the pressure of the lower cavity 6-4 reduces due to the release of medium 4 in bottle 1, and the piston 6-2 moves down and resets, thus realizing the automatic closure of valve port 6-7 and stopping the release of medium 4 from nozzle 8.

By controlling the discharge volume of the upper cavity 6-3, the upward stroke of the piston 6-2 can be controlled, thereby controlling the opening of the valve port 6-7.

The electronic control device is a bottle solenoid valve 2 (bottle top solenoid valve or bottle side solenoid valve), the bottle solenoid valve 2 controls the opening and closing of the valve interface 6-8 (bottle top solenoid valve interface or bottle side solenoid valve interface), and the upper cavity 6-3 is connected with the outside world by the valve interface 6-8, the controller 11 controls the opening or closing of the bottle solenoid valve 2, when the bottle solenoid valve 2 opens, the gas in the upper cavity 6-3 can be discharged outward through the valve interface 6-8.

The electronic control device is an electromagnetic actuator 15, the upper cavity 6-3 is provided with a check valve, the opening or closing of the check valve is controlled by the electromagnetic actuator 15, the triggering thimble is movably arranged in the internal of the electromagnetic actuator 15, the electromagnetic actuator 15 realizes the signal transmission with the control 11 by wired or wireless mode, the controller 11 can control the up and down movement of the triggering thimble of the electromagnetic actuator 15.

When the triggering thimble moves downward, the triggering thimble can open the check valve, and the gas in the upper cavity 6-3 discharges outward through the opened check valve, the pressure of the upper cavity 6-3 reduces, and the piston 6-2 moves upward, so as to realize the opening of the valve port 6-7.

When the triggering thimble moves upward, the check valve automatically resets and closes, the piston 6-2 moves down to reset, so as to realize the closure of the valve port 6-7.

The upper cavity 6-3 is provided with a check valve, the opening or closing of the check valve is controlled by manually starting device, opening the check valve by manually starting device, the gas in the upper cavity 6-3 discharges outward, the pressure of the upper cavity 6-3 reduces, and the piston 6-2 moves upward, so as to realize the manual opening of the valve port 6-7. by closing the check valve by manually starting device, the piston moves down to reset, so as to realize the automatically closure of the valve port 6-7.

The manual starting device is a self-closing device 3, a thimble 3-2 is arranged in the self-closing device 3, which corresponds to the check valve, when pressing down the self-closing handle 3-4 of the self-closing device 3, it can drive the thimble 3-2 down, when the thimble 3-2 moves down, the check valve can be opened, and the gas in the upper cavity 5-3 discharges outward, when loosening the self-closing handle 3-4 of the self-closing device 3, the thimble 3-2 automatically resets, and the check valve automatically closes.

A through hole is arranged on the piston 6-2, which connects the upper cavity 6-3 with the lower cavity 6-4, all or part of the through hole is a capillary hole 6-21, the through hole can supply gas to the upper cavity 6-3, and make the piston 6-2 move down to reset, the stroke of the piston 6-2 and the opening of the valve port 6-7 is controlled by the pressure difference caused with the gas discharge in the upper cavity 6-3 and the gas supply through the through hole.

The upper part of the piston 6-2 is provided with a spring.

The valve port 6-7 connects multiple nozzles 8 through the releasing pipe 13, multiple nozzles 8 in parallel, multiple nozzles 8 are arranged in multiple protected space from Z1 to Zn, an electric zone valve 7 is arranged on the releasing branch where each nozzle 8 is located, the electric zone valve 7 realizes signal transmission with the controller 11 by wired or wireless mode, the signal acquisition element 12 is arranged in each protected space from Z1 to Zn, the signal acquisition element 12 realizes signal transmission with the controller 11 by wired or wireless mode.

When the electric zone valve 7 of one or more protected spaces is opened and the valve port 6-7 is opened, the medium 4 in the bottle 1 can be released through the nozzle 8 to the protected space.

The signal acquisition element 12 is any one or several of a smoke detector, a temperature detector, a smoke temperature composite detector, a flame detector, a gas detector, a temperature sensing cable, a temperature control switch, a temperature sensor, a thermocouple, an acceleration sensor, a pressure sensor, an oil spray leakage detector and a signal monitoring device for a protective device or a protective location.

The valve body 6-1 is provided with a pressure monitor interface 6-10, and the pressure monitor interface 6-10 is connected with the lower cavity 6-4, the pressure monitor interface 6-10 connect to the pressure monitor 5, the pressure monitor 5 realizes signal transmission with the controller 11 by wired or wireless mode, the pressure monitor 5 collects the pressure value or pressure drop value in the inner cavity of bottle 1 in real time, and transmits the collected pressure signal to the controller 11.

The valve body 6-1 is provided with a release monitor interface 6-9, which corresponds to the position of valve port 6-7, the release monitor interface 6-9 connect the pressure sensor 14, the pressure sensor 14 realizes signal transmission with the controller 11 by wired or wireless mode, when valve port 6-7 is opened, pressure sensor 14 will transmit the pressure signal collected at the valve port 6-7 to the controller 11.

The present invention also provides an automatic control method of an Automatic safeguard bottle System, and the technical solution is as follows:

Step one, collect signals from Z1 to Zn in one or more protected spaces by one or more signal acquisition elements 12, and transmit the acquisition signals to the controller 11.

Step two, the controller 11 analyzes the acquisition signals and sends out the command signal.

When the acquisition signal of one or more protected spaces exceeds the rated safety value, controller 11 sends the dangerous alarm signal of one or more protected spaces as the command signal.

When the collected signal of one or more protected spaces exceeds the safety limit value but does not reach the destruction value, the controller 11 sends an opening signal as an instruction signal to enable the electronic control device to open, and the nozzle 8 in this protected space automatically releases the medium.

Step three, the controller 11 controls the opening time and/or times of the electric control device according to the volume of the protected space, when the opening time expires, the controller 11 closes the electric control device, the piston 6-2 of the bottle valve 6 automatically reset, the bottle valve 6 closes, the nozzle 8 automatically stops releasing medium, when the predetermined interval of said opening time is satisfied, the controller 11 opens the electronic control device again, so as to realize multiple releasing.

The technical effects of the present invention are as follows:

The present invention has two starting modes, remote electrical automatic control and on-site manual control, to ensure the safety of the premises or the operation of the facilities, to meet customers' differentiated needs and improve personal and property safety, and to fill the defects of fixed fire extinguishing system and water mist cooling system, which have many components and complex installation.

The present invention can not only be used to extinguish a fire, but also realize the prevention of a fire at the early stage. Because there are various symptoms before the fire occurs, such as electric current is too large, rapid temperature rise, gas leakage, fuel spray, etc., the present invention adopts effective detection and realize timely alarm and automatic intervention, releases medium before the fire occurs as to realize cooling, flame retardant and explosion suppression, thus preventing the fire to occur, really nip in the bud ahead of burning and effectively preserve equipment to minimize losses.

The present invention can set the opening time of the bottle solenoid valve and the electric zone valve according to the fire situation, the damage level and/or the volume of the protected space, thereby quantitatively releasing the medium for the protected space with many times. The present invention also can simultaneously or successively release media on multiple protected spaces, thereby realizing simultaneous protection of multiple protected spaces.

BRIEF DESCRIPTION OF THE DRAWINGS

It should be understood by those skilled in the art that the following description is merely a schematic illustration of the principles on the present invention, which can be applied in a variety of ways to achieve many different alternative embodiments. These explanations are used only to illustrate the general principles of the teaching content on the present invention, and do not mean to limit the inventive ideas disclosed herein.

The embodiments of the present invention are illustrated in conjunction with the accompanying drawings which form part of the present specification and are used to explain the principles of the present invention together with the general description above and the detailed description of the following drawings.

Figure 1:
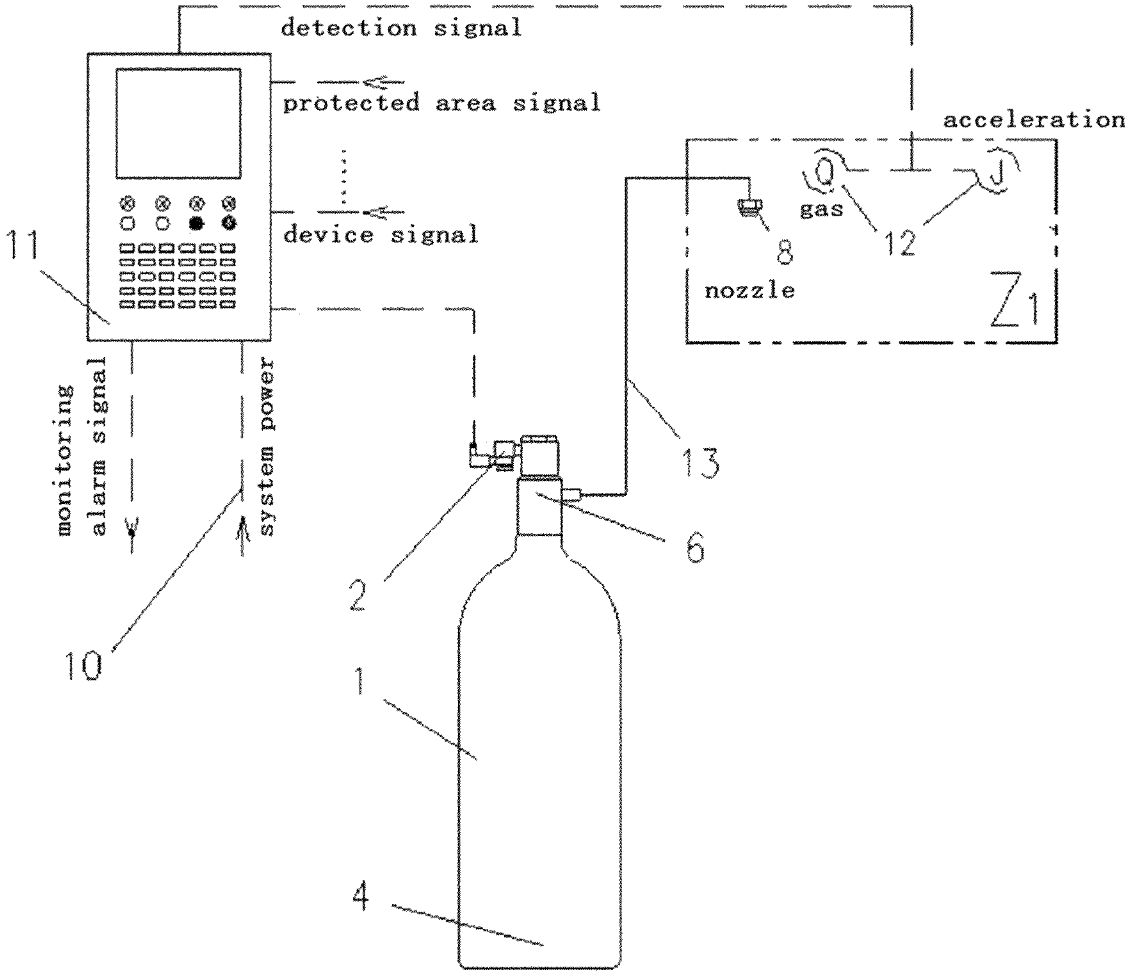

The following is a further detailed explanation of the invention based on the attached drawings and the specific embodiments:

FIG. 1 is a schematic diagram of the Automatic safeguard bottle System of the present invention.

Figure 2:
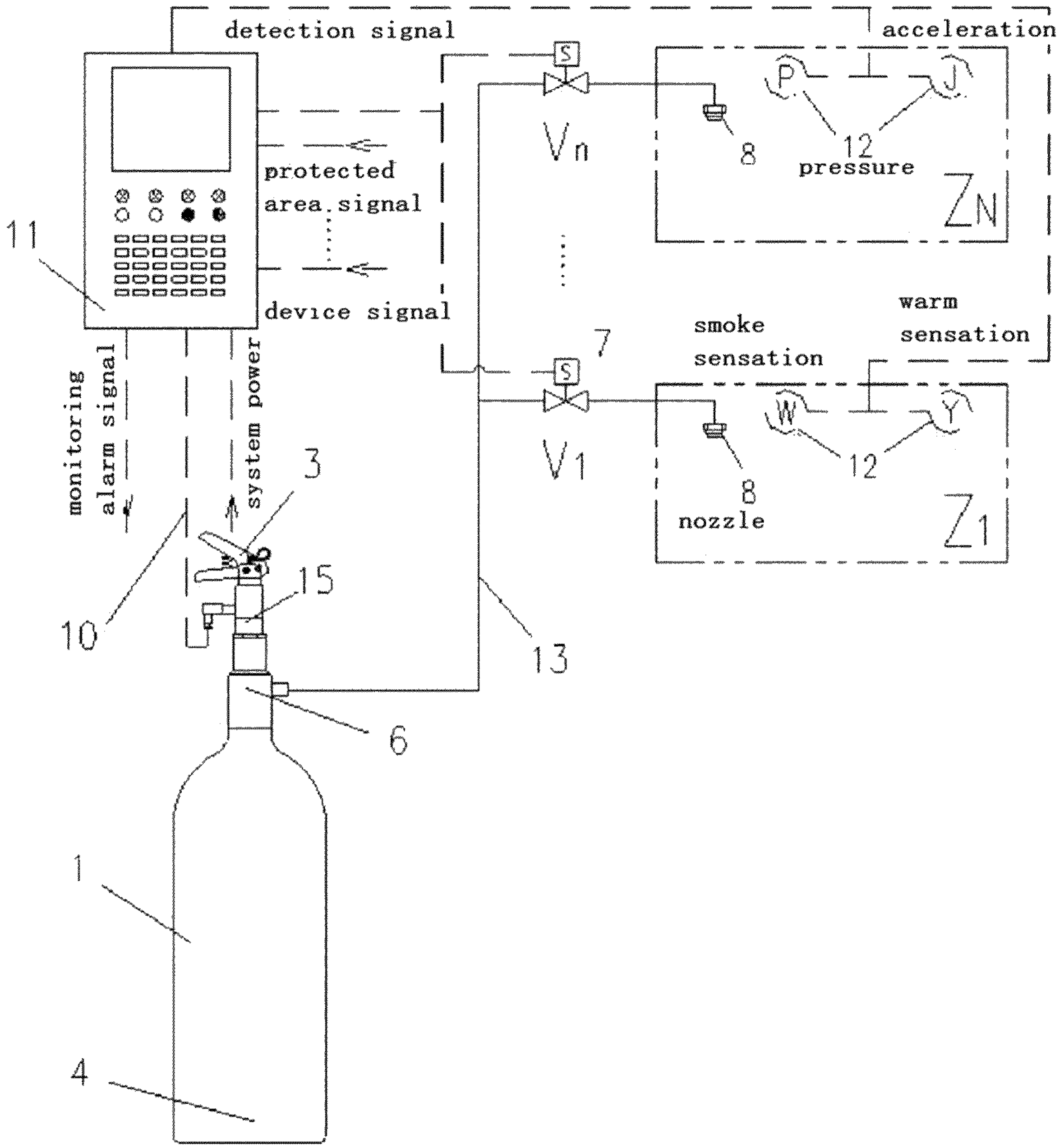

FIG. 2 is a schematic diagram of another embodiment of the present invention.

Figure 3:
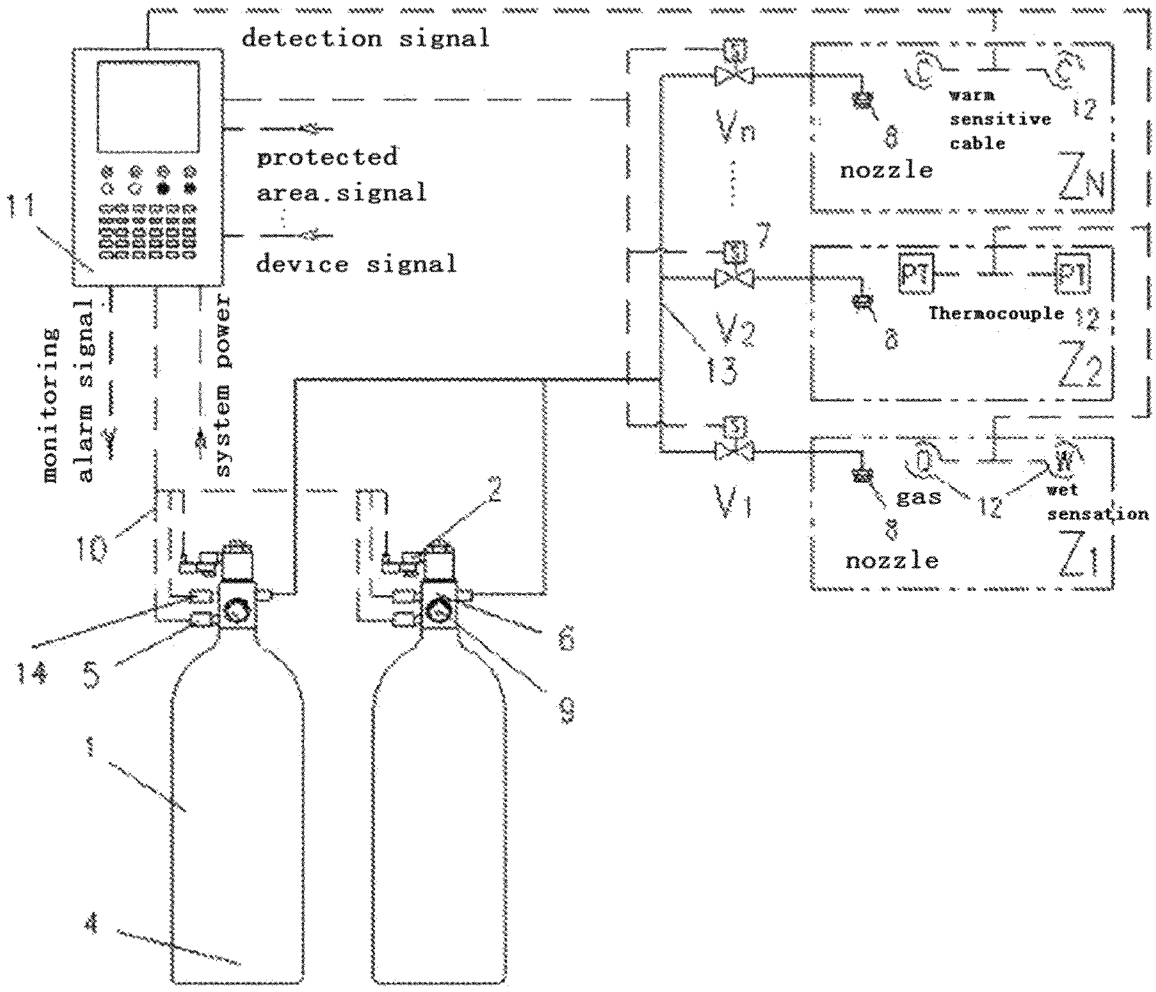

FIG. 3 is a schematic diagram of the third embodiment of the present invention.

Figure 4:
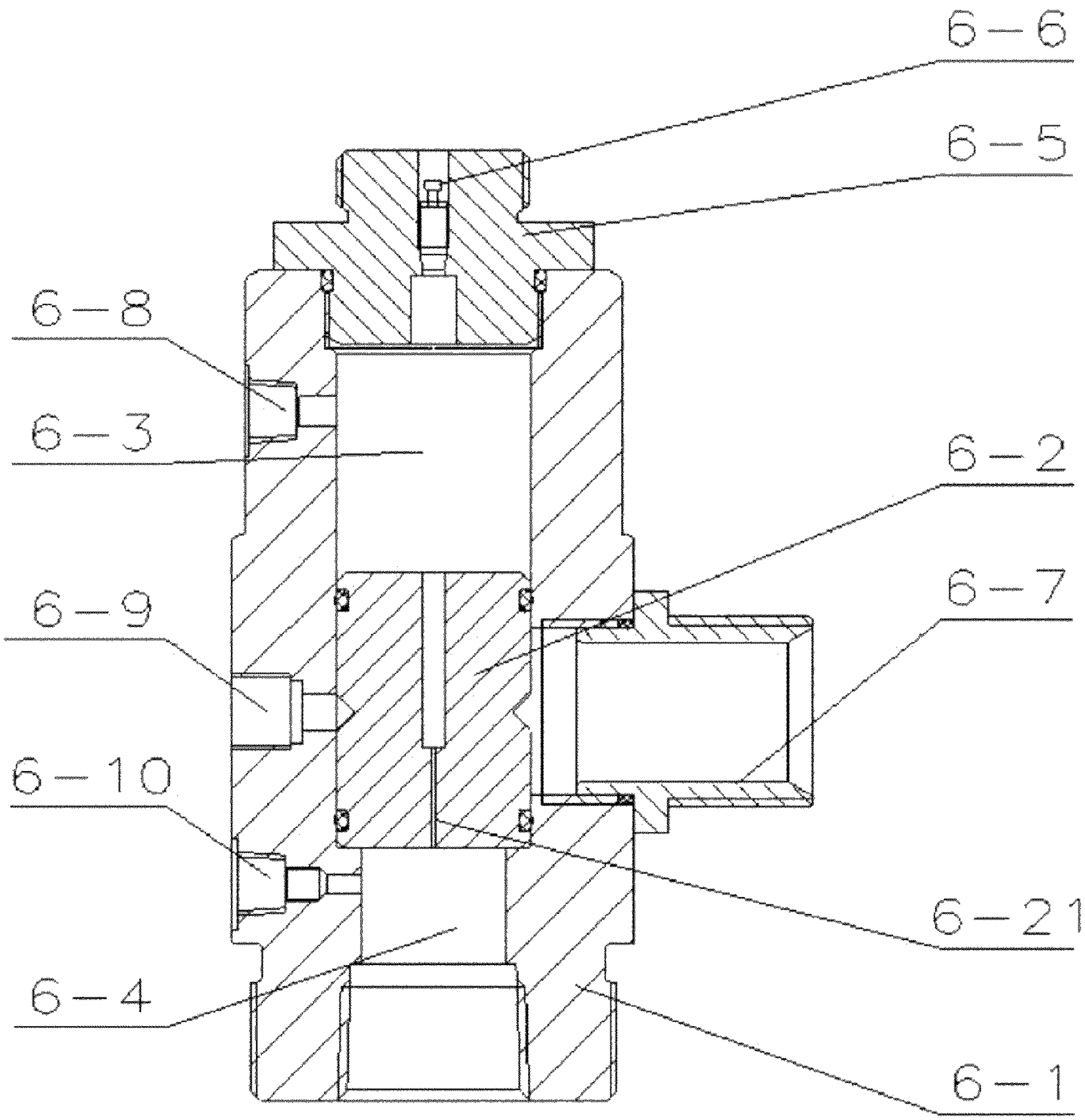

FIG. 4 is a schematic diagram of the bottle valve of the present invention.

Figure 5:
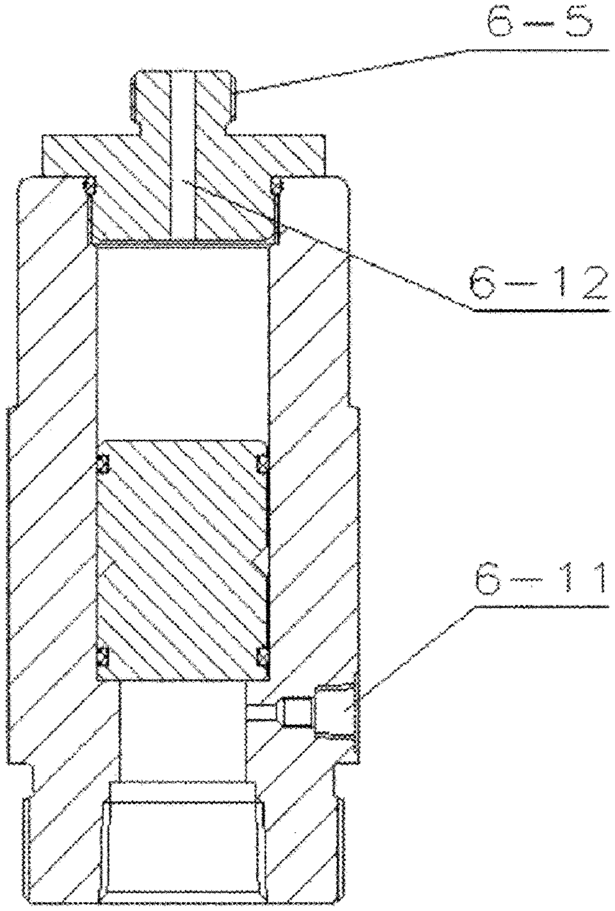

FIG. 5 is a schematic diagram of another embodiment of the bottle valve of the present invention.

Figure 6:
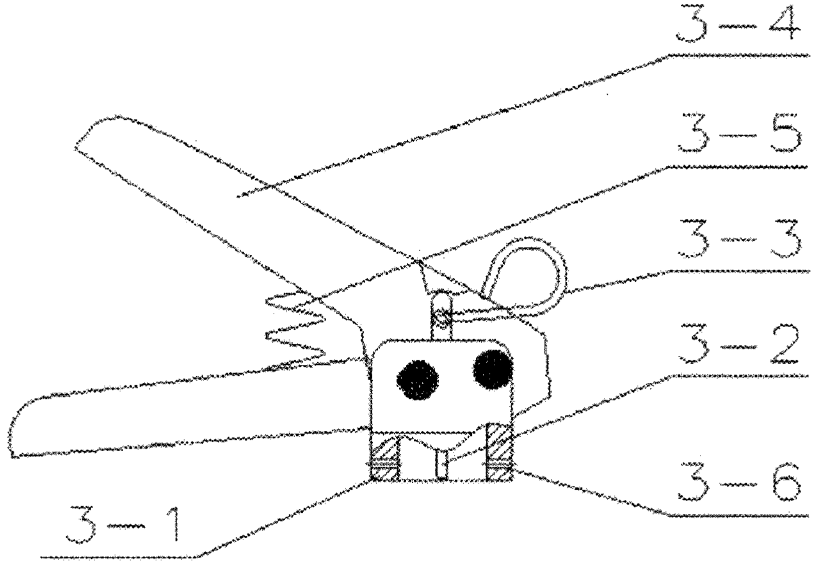

FIG. 6 is a schematic diagram of the manual starting device of the present invention.

DESCRIPTION OF THE ATTACHED DRAWINGS

1 is bottle, 2 is bottle solenoid valve,
3 is manual starting device, 4 is medium,
5 is pressure monitor, 6 is bottle valve,
7 is electric zone valve, 8 is nozzle,
9 is pressure indicator, 10 is cable,
11 is controller, 12 is signal acquisition element,
13 is releasing pipe, 14 is pressure sensor,
15 is electromagnetic actuator.
3-1 is connection part, 3-2 is thimble,
3-3 is lock mechanism of self-closing handle, 3-6 is vent hole,
3-5 is spring,
6-1 is valve body, 6-2 is piston,
6-3 is the upper cavity, 6-4 is the lower cavity,
6-5 is bonnet, 6-6 for needle valve,
6-7 is valve port, 6-8 is valve interface,
6-9 is release monitor interface,
6-10 is pressure monitor interface,
6-11 is pressure indicator interface, 6-12 is vent hole,
6-21 is capillary hole.

DETAILED DESCRIPTION

In order to make the purpose, technical scheme and advantages of the embodiments of the present invention clearer, the technical scheme of the embodiments of the present invention will be described clearly and completely in connection with the accompanying drawings of the embodiments of the present invention. Obviously, the described embodiments are part of the embodiments of the invention, not all of them. Based on the embodiments of the present invention described herein, all other embodiments acquired by ordinary technicians in the field without creative work fall within the scope of protection of the present invention. Unless otherwise defined, the technical terms or scientific terms used herein shall be of general significance to those with general skills in the field to which the invention belongs. Similar terms such as “include” used in this article indicate that the elements or objects before the word now cover the elements or objects listed after the word and their equivalents, without excluding other elements or objects. Similar words such as “connect” or “connection” are not limited to physical or mechanical connections, but can include electrical connections, whether direct or indirect. “Up” and “down” are only used to represent the relative position relationship. When the absolute position of the object is changed, the relative position relationship may change accordingly.

As shown in FIG. 1, the automatic safeguard bottle system of the present invention comprises a bottle 1, a medium 4 is contained in the bottle 1, and a differential pressure bottle valve 6 is fixed in the mouth of the bottle 1.

As shown in FIG. 4, the bottle valve 6 includes valve body 6-1, and the valve body 6-1 is fixed at the mouth of bottle 1, the valve body 6-1 is provided with a piston 6-2, and the piston 6-2 divides the inner cavity of the valve body 6-1 into the upper cavity 6-3 and the lower cavity 6-4, and the lower cavity 6-4 is connected with the inner cavity of the bottle 1. The valve port 6-7 is arranged on the side wall of the valve body 6-1. The piston 6-2 can move up and down in the inner cavity of the valve body 6-1 when the gaseous pressure in the upper cavity 6-3 and/or the lower cavity 6-4 changes, so as to realize the opening (full or partial opening) or closing (full closing) of the valve port 6-7.

The valve port 6-7 connects the nozzle 8 through the releasing pipe 13, the nozzle 8 is arranged in the protected space Z1.

The signal acquisition element 12 is arranged in the protected space Z1, the signal acquisition element 12 realizes signal transmission with the controller 11 by wired or wireless mode.

The controller 11 realizes power supply and signal transmission by the cable 10.

The signal acquisition element 12 can be smoke detector, temperature detector, smoke temperature composite detector, flame detector, gas detector, temperature cable, temperature control switch, temperature sensor, thermocouple, acceleration sensor, pressure sensor, oil spray leakage detector and one or more of the signal monitoring devices for protection equipment. The signal monitoring device can provide the limit warning signal of BMS (battery management system), control cabinet, internal combustion engine, motor and other control equipment or high-risk equipment, such as overcharge, over-discharge, current, voltage, pressure, temperature, acceleration, leakage and other signals.

As shown in FIG. 4, a valve interface 6-8 is provided on the upper part of the body 6-1, and the valve interface 6-8 is connected with the upper cavity 6-3, the valve interface 6-8 connect the bottle solenoid valve 2. As shown in FIG. 1, the bottle solenoid valve 2 realizes signal transmission with the controller 11 by wired or wireless mode. The controller 11 can be relay box, printed circuit board or programmable logic controller. The controller 11 can open or close the bottle solenoid valve 2 on site or remotely. When the bottle solenoid valve 2 is opened, all or part of the gas in the upper cavity 6-3 of the bottle valve 6 is discharged outward through the valve interface 6-8. The pressure value of the upper cavity 6-3 reduces and the piston 6-2 moves upward, so as to realize the opening of the valve port 6-7. When the bottle solenoid valve 2 is closed, the piston 6-2 moves down to reset, so as to realize the closure of valve port 6-7.

When the valve port 6-7 is open (fully or partially), the medium 4 in the bottle 1 can be released through the nozzle 8. The medium 4 has the function of fire extinguishing, flame-retardant, cooling or explosion suppression and is stored in the bottle 1 with pressurization in the form of liquid, solid or gas.

Choose the solenoid valve 2 with different flow rate to control the discharge volume of the upper cavity 6-3, so as to control the upward stroke of the piston 6-2 and the opening of the valve port 6-7, so as to control the medium capacity released by the nozzle 8.

Preferably, the following method can accelerate the downward displacement and reset of the piston 6-2:

The first type, the piston 6-2 is provided with a through hole, which connects the upper cavity 6-3 with the lower cavity 6-4, and the through hole is capillary 6-21. For the convenience of processing, the part of the through hole can also be capillary 6-21. As shown in FIG. 4, the lower half of the through hole is the capillary 6-21.

When the bottle solenoid valve 2 is opened, the flow rate of gas discharged from the upper cavity 6-3 is much larger than the flow rate from the lower cavity 6-4 through capillary hole 6-21 to the upper cavity 6-3, the pressure value of the upper cavity 6-3 reduces rapidly, which destroys the pressure balance between the upper cavity 6-3 and the lower cavity 6-4, the piston 6-2 moves upward, so as to realize the opening of the valve port 6-7.

When the bottle solenoid valve 2 is closed, the gas in the lower cavity 6-4 fills the upper cavity 6-3 through the capillary hole 6-21. When the pressure balance between the upper cavity 6-3 and the lower cavity 6-4 is changed, the piston 6-2 moves down and resets, and the valve port 6-7 automatically closes.

The second type, the upper cavity 6-3 of bottle valve 6 can be connected to the gas bottle through the gas pipeline, and the upper cavity 6-3 of the bottle valve 6 can be supplied with gas through the gas pipeline.

The third type, a spring can be installed above the piston 6-2. When the bottle solenoid valve 2 is opened, the gas in the upper cavity 6-3 will be discharged outward, and the piston 6-2 will move up against the spring force, so as to realize the opening of valve port 6-7.

When the bottle solenoid valve 2 is closed, the spring causes the piston 6-2 to move down to reset, and the valve port 6-7 automatically closes.

As shown in FIG. 4, the bonnet 6-5 is fixed on top of the valve 6-1. The bottom of the bonnet 6-5 may be threaded to the top of the valve body 6-1 for a fixed connection to the valve body 6-1.

As shown in FIG. 5, a vent hole 6-12 can also be opened in the bonnet 6-5 to connect the upper cavity 6-3 with the outside world. The bottle solenoid valve 2 connected to top of the bonnet 6-5. When the bottle solenoid valve 2 is opened, the gas in the upper cavity 6-3 can be discharged outward through the vent hole 6-12.

As another embodiment of the electrical automatic starting, the needle valve 6-6 can be set in the bonnet 6-5. The bonnet 6-5 of the bottle valve 6 is connected to the electromagnetic actuator 15. The electromagnetic actuator 15 is movably provided with a triggering thimble. The needle valve 6-6 is located below the triggering thimble. The electromagnetic actuator 15 realizes signal transmission with the controller 11 by wired or wireless mode. The controller 11 can control the triggering thimble of the electromagnetic actuator 15 to move up and down.

When the triggering thimble moves downward, the triggering thimble can apply force to the needle valve 6-6 to make it open, so that the gas in the upper cavity 6-3 of the bottle valve 6 can discharge through the opened needle valve 6-6, the pressure value of the upper cavity 6-3 reduces, and the piston 6-2 moves upward, so as to realize the opening of the valve port 6-7.

When the triggering thimble moves upward, the needle valve 6-6 automatically resets and closes, the piston 6-2 moves down to reset, so as to realize the closure of the valve port 6-7.

The working principle of the needle valve 6-6 is the same as that of the valve core. The needle valve 6-6 opens after the top is pressed, and the needle valve 6-6 automatically resets and closes without the pressure. The needle valve 6-6 adopts existing technology, which is not described here. Of course, other check valves can also be used.

The present invention can also set a manual starting device on the bottle valve 6, and manually control the opening of the bottle valve 6 through the manual starting device. The manual starting device can be the self-closing device 3.

As shown in FIG. 6, the self-closing device 3 includes self-closing handle connecting part 3-1, and the self-closing handle connecting part 3-1 connecting the root of the self-closing handle 3-4. A spring 3-5 is set between the self-closing handle 3-4. A self-closing handle lock mechanism 3-3 is arranged at the middle of the self-closing handle 3-4. The self-closing handle lock mechanism 3-3 through the insurance pin or other ways of locking. When the self-closing handle 3-4 is lock mechanism 3-3 inserted with the insurance pin, the self-closing handle lock mechanism 3-3 is in a locked state, at this time the self-closing handle 3-4 can not be pressed down. When the insurance pin is removed, release the locking of the locking of self-closing handle 3-4, at this time the spring 3-5 elastic force can be overcome and the spring 3-4 will be pressed down.

The self-closing handle 3-4 fixed connection the thimble 3-2. The thimble 3-2 is arranged in the cavity of the self-closing handle connecting part 3-1. When pressing down the self-closing handle 3-4, it can cause the thimble 3-2 to move down.

The self-closing handle connection part 3-1 is provided with at least one vent hole 3-6.

The self-closing handle connection part 3-1 of the self-closing device 3 is fixedly connected the top of the bonnet 6-5. The top of the bonnet 6-5 can be threaded to the bottom of the bottle valve 6, so as to realize the fixed connection between the bottle valve 6 and the self-closing device 3. The thimble 3-2 of the self-closing device 3 corresponds to the needle valve 6-6.

Manually press the self-closing handle 3-4 of the self-closing device 3, the self-closing handle 3-4 to drive the thimble 3-2 down, the thimble 3-2 forces the needle valve 6-6 of the bottle valve 6 to make it open, so that the gas in the upper cavity 6-3 of the bottle valve 6 is discharged outward through the opened needle valve 6-6, the pressure value of the upper cavity 6-3 reduces, and the piston 6-2 moves upward, so as to realize the opening of valve port 6-7.

Release the self-closing handle 3-4 of the self-closing device 3, the thimble 3-2 moves upward to reset, and close the needle valve 6-6. The piston 6-2 moves down to reset, the valve port 6-7 is automatically closed.

Preferably, the electromagnetic actuator 15 and the self-closing device 3 can also be set at the same time. As shown in FIG. 2, the electromagnetic actuator 15 is set between the self-closing device 3 and the bottle valve 6. The lower end of the electromagnetic actuator 15 is connected to the bonnet 6-5 of the bottle valve 6, and the upper end of the electromagnetic actuator 15 is connected to the self-closing handle connecting part 3-1 of the self-closing device 3. The upper end of the triggering thimble is pressed against the thimble 3-2 of the self-closing device 3, and the needle valve 6-6 is located below the triggering thimble.

In order to realize the safety protection of multiple protected spaces, as shown in FIG. 2, make the valve port 6-7 of the bottle valve 6 connect multiple nozzles 8 through the releasing pipe 13. Multiple nozzles 8 in parallel. Multiple nozzles 8 are respectively arranged in multiple protected spaces from Z1 to Zn. An electric zone valve 7 is arranged on the releasing branch where each nozzle 8 is located. The electric zone valve 7 realizes signal transmission with the controller 11 by wired or wireless mode. The electric zone valve 7 can be solenoid valve, electric ball valve or other electric valve.

The signal acquisition element 12 is arranged in each protected space from Z1 to Zn. The signal acquisition element 12 realizes signal transmission with the controller 11 by wired or wireless mode.

As shown in FIG. 3, the Automatic safeguard bottle System of the present invention can include multiple bottle 1 in parallel, the bottle solenoid valve 2 of each bottle 1 realizes signal transmission with the controller 11 by wired or wireless mode respectively. The pressure monitor 5 of each bottle 1 realizes signal transmission with the controller 11 by wired or wireless mode respectively. The pressure sensor 14 of each bottle 1 realizes signal transmission with the controller 11 by wired or wireless mode respectively. The Valve ports 6-7 of multiple bottle bodies 1 are connected to the releasing pipe 13 through parallel pipelines.

As shown in FIG. 4, pressure monitor interface 6-10 is provided at the lower part of the valve body 6-1, and the pressure monitor interface 6-10 is connected to lower cavity 6-4. The pressure monitor interface 6-10 is connected with the pressure monitor 5 to monitor the pressure value or pressure change in the inner cavity of bottle 1. The pressure monitor 5 realizes signal transmission with the controller 11 by wired or wireless mode. The pressure monitor 5 collects the pressure value or pressure drop value of the inner cavity of bottle 1 in real time, and transmits the collected signals to the controller 11. When the pressure value is lower than the set value, a monitoring alarm signal will be sent to remind the personnel to fill or change the bottle group to ensure that the automatic safeguard bottle is in standby state at any time. The pressure monitor 5 can be a pressure switch or pressure transmitter.

As shown in FIG. 4, the release monitor interface 6-9 can be provided with the valve body 6-1, which corresponds to the position of the valve port 6-7. The release monitor interface 6-9 is connected with the pressure sensor 14. The pressure sensor 14 realizes signal transmission with the controller 11 by wired or wireless mode.

When the bottle valve 6 is opened, the medium 4 in the bottle 1 is released from the valve port 6-7. At this time, the pressure monitor 14 senses the pressure value at the valve port 6-7 and transmits the signal to the controller 11, which sends out the system releasing signal.

As shown in FIG. 5, the pressure indicator interface 6-11 can be provided at the lower part of the valve body 6-1, and the pressure indicator interface 6-11 is connected with lower cavity 6-4. The pressure indicator interface 6-11 is fixedly connected with the pressure indicator 9 to monitor and display the pressure value in the inner cavity of the bottle 1 in real time.

The present invention can realize two start-up modes, and its working principle is as follows:

Remote electrical automatic starting: multiple signal acquisition elements 12 respectively detect Z1 to Zn in each protected space and transmit acquisition signals to controller 11. When the detection value of a certain protected space reaches the set value, controller 11 sends an opening instruction to the bottle solenoid valve 2 or the electromagnetic actuator 15. The opening of the bottle solenoid valve 2 or the electromagnetic actuator 15 causes the opening of the needle valve 6-6 and causes the pressure imbalance in the bottle valve 6. At the same time, the controller 11 sends an opening instruction to the electric zone valve 7 of the nozzle 8 in the protected space, and then the medium 4 in the bottle 1 will be released automatically through the nozzle 8 in the protected space.

According to the volume of the protected space, the controller 11 controls the opening time of the bottle solenoid valve 2 or the solenoid actuator 15 and the electric zone valve 7.

When the predetermined interval of said opening time is satisfied, the controller 11 makes the bottle solenoid valve 2 and the electric zone valve 7 to be closed. At the same time, the piston 6-2 moves downward to reset, the bottle valve 6 closes, and the medium 4 in the bottle 1 stops releasing out. The remote electric automatic starting mode is multiple releasing.

On-site manual starting: if fire is found in a protected space, press the start button of the electric zone valve on the controller 11 to open the electric zone valve 7 for the protected space. Thereafter, the control is exactly the same as the remote electric automatic starting, which is no longer described. The on-site manual starting mode in the field is multiple releasing.

The automatic control method of the Automatic safeguard bottle System of the present invention includes the following steps:

Step one, collect signals from Z1 to Zn in one or more protected spaces by one or more signal acquisition elements 12, and transmit the acquisition signals to the controller 11.

Step two, the controller 11 analyzes the acquisition signals and sends out the command signal.

When the acquisition signal of one or more protected spaces exceeds the rated safety value, the controller 11 sends the dangerous alarm signal of one or more protected spaces as the command signal.

When the collected signal of one or more protected spaces exceeds the safety limit but does not reach the destruction value, the controller 11 sends an opening signal as an instruction signal to enable the electronic control device to open, and the nozzle 8 in this protected space automatically releases the medium.

Step three, the controller 11 controls the opening time and/or times of the electric control device according to the volume of the protected space, when the opening time expires, the controller 11 closes the electric control device, the piston 6-2 of bottle valve 6 automatically reset, the bottle valve 6 closes, the nozzle 8 automatically stops releasing medium, when the predetermined interval of said opening time is satisfied, the controller 11 opens the electronic control device again, so as to realize multiple releasing.

Wherein, rated safety value<safety limit value<destruction value.

The present invention can select different signal acquisition elements according to different protected objects, so as to realize diversified exploration and measurement. For example, when the protection object is battery compartment of electric vehicle, acceleration sensor is adopted as signal acquisition element 12. When the electric vehicle collides sharply, the acceleration sensor senses that the acceleration signal exceeds the safety limit value. The controller 11 sends the opening signal, which makes the bottle solenoid valve 2 and the electric zone valve 7 open, and the nozzle 8 releases the medium automatically, thus playing the role of explosion suppression, avoiding the explosion of lithium battery due to sharp deformation and short circuit and extending the escape time of personnel and ensure property safety to the greatest extent.

Automatic Control Embodiment 1

Multiple signal acquisition elements 12 detect Z1 to Zn in each protected space, and transmit the acquisition signals to the controller 11, the controller 11 analyzes the collected signals.

When the smoke detector or temperature detector signal in the protected space Z1 is more than the set value of fire alarm, the controller 11 will send out the dangerous alarm signal of Z1 in the protected space and remind the personnel to check and confirm at the site.

When the collected signals of smoke detector and temperature sensor of the protected space Z1 exceed the set value of fire alarm, the controller 11 will send an opening signal, making the bottle solenoid valve 2 and the electric zone valve 7 of the protected space Z1 open, and the nozzle 8 of the protected space Z1 automatically release the medium, so as to conduct automatic fire extinguishing operation in the protected space Z1.

Automatic Control Embodiment 2

The signal monitoring device of the BMS (battery management system) of the electric vehicle transmits the signal to controller 11, controller 11 analyzes the signal. When BMS sends out abnormal signals, such as high temperature, excessive current, excessive voltage, overcharge, overdischarge, etc., controller 11 sends an opening signal, making the bottle solenoid valve 2 or the electromagnetic actuator 15 and the electric zone valve 7 open, and the nozzle 8 automatically release the medium, so as to cool down the battery box and protect the flame-retardant for safety measure. When the abnormal signals are ended, the controller 11 will send off the signal to reset the system to its original state. Repeat this procedure to ensure that the battery compartment and BMS are in a safe state or to suppress abnormal conditions.

Automatic Control Embodiment 3

When the nozzle 8 of the protected space Z1 automatically releases the medium and the collected signal of the protected space Z2 also exceeds the safety limit value, the controller 11 will send an opening signal, making the electric zone valve 7 of the protected space Z2 open and the nozzle 8 of the protected space Z2 automatically releases the medium, so as to protect the protected space Z2.

The present invention is suitable for the industrial, commercial, civil, and transportation in the spaces of narrow space, high-risk equipment, the safety protection of inaccessible place, completely eliminate potential safety hazards caused by electrical, thermal surface, gas or fuel leakage in distribution panel, control cabinets, lifting equipment, micro power cabins, lithium battery boxes, traffic vehicles, construction machinery, port machinery equipment, wind turbine engine room, etc.

Although embodiments of the present invention are described in detail above, it is obvious to those skilled in the art that various modifications and changes can be made to these embodiments. However, it should be understood that such modifications and changes fall within the scope and spirit of the present invention as described in the claims. Furthermore, the present invention described herein may have other embodiments and may be implemented or implemented in various ways.

The invention claimed is:

1. An automatic safeguard bottle system, for usage in the safety protection of a protected space, comprising:

a safeguard bottle, including a bottle with a pressurized storage medium and a bottle valve, wherein said bottle valve includes a valve body installed on said bottle, a piston movably arranged in an inner cavity of said valve body, and a valve port arranged on a side wall of said valve body, wherein said inner cavity of said valve body is divided into an upper cavity and a lower cavity by said piston, and said lower cavity is connected with an inner cavity of said bottle, and wherein said valve port can open and close according to an upward movement and a downward movement of said piston, respectively, led by a pressure difference between said upper cavity and said lower cavity, for controlling a release and a stop release of said pressurized storage medium;

at least one nozzle, which is arranged in said protected space and connected with said valve port of said bottle valve;

a signal acquisition element, which is arranged in the protected space for collecting signals from said protected space;

an electric control device, which is connected with said upper cavity of said bottle valve for controlling said bottle valve; and a controller, which is connected with said signal acquisition element and said electric control device respectively, for controlling said electric control device by a detection signal from said signal acquisition element, wherein, when said detection signal is monitored as an abnormal signal, said controller controls said electric control device to open said bottle valve such that a pressure in said upper cavity reduces to cause the upward movement of said piston and opening of said valve port, thereby said at least one nozzle releases the medium to said protected space within an opening time corresponding to a volume of said protected space, and when said opening time expires, said controller controls said electric control device to close said bottle valve such that pressure reduction in said upper cavity stops to cause the downward movement and reset of said piston and closing of said valve port, thereby said at least one nozzle stops releasing said medium; and wherein the release and the stop release of said medium controlled through said piston moving upward and downward in said bottle valve are repeatable in cycles before said abnormal signal is no longer present.

2. The automatic safeguard bottle system according to claim 1, wherein, when a predetermined interval of said opening time is executed and said abnormal signal is still present, said controller controls said electric control device to open said bottle valve again, so that said at least one nozzle releases said medium to said protected space within said opening time again, allowing multiple release of said medium.

3. The automatic safeguard bottle system according to claim 1, wherein, said electric control device is an electromagnetic actuator, and a triggering thimble is arranged in said electromagnetic actuator, a needle valve is arranged on said upper cavity and located below said triggering thimble, and said upper cavity is connected with an outside world through said needle valve, said controller controls said electromagnetic actuator so that said triggering thimble can move up and down, when said triggering thimble moves downward, said needle valve is opened so that a gas in said upper cavity is discharged to the outside world through said needle valve, and the pressure in said upper cavity reduces so that said piston moves upward, and then said valve port is opened to allow said at least one nozzle to release said medium, a stroke of said piston is controlled by the amount of the gas in said upper cavity, thereby controlling the opening of said valve port, when said triggering thimble moves upward, said needle valve is closed so that said piston moves downward and resets, thereby closing said valve port.

4. The automatic safeguard bottle system according to claim 1, wherein, a bottle solenoid valve interface is arranged on an upper side of said valve body, and said upper cavity is connected with an outside world through said bottle solenoid valve interface, said electric control device is a bottle solenoid valve, which is connected with said bottle solenoid valve interface, when said bottle solenoid valve is opened so that a gas in said upper cavity is discharged to the outside world through said bottle solenoid valve interface, the pressure in said upper cavity reduces so that said piston moves upward, and then said valve port is opened to allow said at least one nozzle to release said medium, a stroke of said piston is controlled by the amount of the gas in said upper cavity, thereby controlling the opening of said valve port, when said bottle solenoid valve is closed, said piston moves downward and resets, thereby closing said valve port.

5. The automatic safeguard bottle system according to claim 4, further comprising:

a self-closing device, used for controlling said bottle valve manually, which has a thimble and a self-closing handle for driving said thimble, wherein, a needle valve is arranged on an upper part of said valve body, and said upper cavity is connected with the outside world through said needle valve, the position of said thimble is corresponding to the position of said needle valve, when said self-closing handle is pressed to make said thimble move downward, said needle valve is opened so that the gas in said upper cavity is discharged to the outside world through said needle valve, and the pressure in said upper cavity reduces so that said piston moves upward, and then said valve port is opened to allow said at least one nozzle to release said medium, when said self-closing handle is loosen, said needle valve is closed so that said piston moves downward and resets, thereby closing said valve port.

6. The automatic safeguard bottle system according to claim 3 or 4, wherein, a through hole is arranged on said piston, all or part of said through hole is a capillary hole so that said upper cavity and said lower cavity can be connected, a gas in said lower cavity can be supplied by said through hole to said upper cavity so that the pressure in said upper cavity can be balanced with that in said lower cavity, and the stroke of said piston is controlled by a pressure difference caused by the gas discharge in said upper cavity and the gas supply through said through hole, thereby controlling the opening of said valve port.

7. The automatic safeguard bottle system according to claim 1, wherein, said protected space is a battery compartment of an electric vehicle, said signal acquisition element is a signal monitoring device of a battery management system of said electric vehicle, and said abnormal signal refers to any signal representing overcharge, over-discharge, current, voltage, pressure, temperature, acceleration and leakage.

8. The automatic safeguard bottle system according to claim 1, further comprising:

a pressure monitor, which is communicatively connected with said controller, wherein said pressure monitor is installed at a lower side of said bottle valve and connected with said inner cavity of said bottle, for collecting a pressure value of said inner cavity of said bottle and sending it to said controller.

9. The automatic safeguard bottle system according to claim 1, further comprising:

a release monitor, which is communicatively connected with the controller, wherein said release monitor is installed on a side part of said bottle valve and corresponding to the position of said valve port, for sensing to determine whether said medium is released to the valve port, and if so, a release signal will be sent to said controller.

10. An automatic safeguard bottle system that is used for safety protection of multiple protected spaces, comprising:

at least one safeguard bottle, including a bottle with a pressurized storage medium and a bottle valve, wherein said bottle valve includes a valve body installed on said bottle, a piston movably arranged in an inner cavity of said valve body, and a valve port arranged on a side wall of said valve body, wherein said inner cavity of said valve body is divided into an upper cavity and a lower cavity by said piston, and said lower cavity is connected with an inner cavity of said bottle, and wherein said valve port can open and close according to an upward movement and a downward movement of said piston, respectively, led by a pressure difference between said upper cavity and said lower cavity, for controlling a release and a stop release of said pressurized storage medium;

multiple nozzles, which are respectively arranged in the corresponding protected spaces and connected with said valve port of said bottle valve through a releasing pipe composed of multiple releasing branches;

multiple signal acquisition elements, which are respectively arranged in the corresponding protected spaces for collecting signals from said protected spaces;

an electric control device, which is connected with said upper cavity of said bottle valve for controlling said bottle valve;

multiple electric zone valves, which are respectively arranged on the corresponding releasing branches for controlling said releasing branches; and a controller, which is connected with said signal acquisition elements, said electric control device and said electric zone valves respectively, for controlling said electric control device and said electric zone valves according to a detection signal from said signal acquisition elements, wherein, when said detection signal is indicated as an abnormal signal, said controller controls said electric control device to open said bottle valve such that a pressure in said upper cavity reduces, causing the upward movement of said piston and opening of said valve port, and controls opening of said electric zone valves on the corresponding releasing branches, thereby said nozzles release the medium to said protected spaces within an opening time corresponding to a volume of said protected spaces, and when said opening time expires, said controller controls said electric control device to close said bottle valve such that pressure reduction in said upper cavity stops to cause the downward movement and reset of said piston and closing of said valve port, thereby said nozzles stop releasing said medium; and the release and the stop release of said medium controlled through said piston moving upward and downward in said bottle valve are repeatable in cycles before said abnormal signal is no longer present.

11. The automatic safeguard bottle system according to claim 10, wherein, a number of said safeguard bottle is 1, a number of said protected space is N, and a number of said nozzles in each said protected space is at least 1, said releasing pipe has a connecting end for connecting with said valve port of said bottle valve and N connecting ends for connecting with said nozzles respectively, or the number of said safeguard bottles is 2, the number of said protected space is N, and the number of said nozzles in each said protected space is at least 1, said releasing pipe has 2 connecting ends each for connecting with said valve port of each said bottle valve and N connecting ends for connecting with said nozzles respectively, N is a positive integer greater than or equal to 2.

* * * * *